July 30, 1940.   N. OBRITSCHKEWITSCH   2,209,843
WAGON TIRE TIGHTENING ASSEMBLY

Filed Dec. 10, 1937

INVENTOR
N. OBRITSCHKEWITSCH
BY
        ATTYS.

Patented July 30, 1940

2,209,843

UNITED STATES PATENT OFFICE 2,209,843

WAGON TIRE TIGHTENING ASSEMBLY

Nickolas Obritschkewitsch, Fox Valley, Saskatchewan, Canada

Application December 10, 1937, Serial No. 179,211

1 Claim. (Cl. 301—102)

My invention relates to improvements in wagon tire tightening assemblies, an object of this invention being to provide means whereby the slack in a metallic wagon tire may be taken up.

A further object of my invention is to provide an assembly of the character herewithin described which may either be fitted to existing wagon wheels or may be incorporated in new wheels.

A further object of this invention is to provide an assembly of the character herewithin described by the use of which the tightening operation of a wagon tire may be effected without the use of skilled labor.

A further object of my invention is to provide an assembly of the character herewithin described in which the various parts composing the same cannot shift out of position.

A further object of this invention is to provide an assembly of the character herewithin described which is economical and of simplified construction.

With the above more important objects in view and such other minor objects as may appear as the specification proceeds, my invention consists essentially in the arrangement and construction of parts all as hereinafter more particularly described, reference being had to the accompanying drawing, in which.

In the drawing like characters of reference indicate corresponding parts in the different figures.

Figure 2:
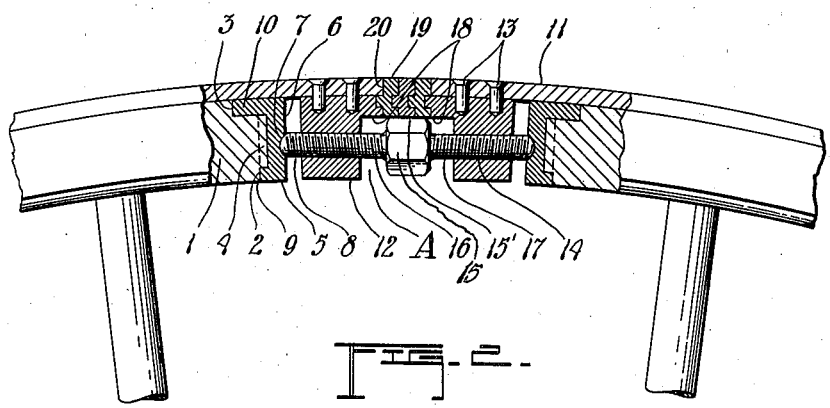
Figure 2 is a view similar to Figure 1 but showing my assembly in longitudinal section.
Figure 1:
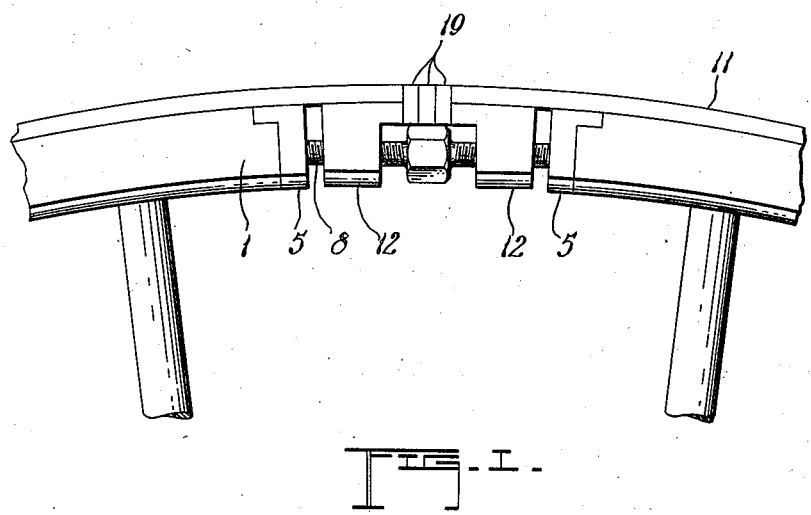
Figure 1 is a side view of a portion of a wagon rim showing my assembly in situ.

It is well known that through usage, the metal tires of wagon wheels lengthen and become loose upon the rims, whereupon it is necessary for a wheelwright to cut the rim and shorten it to take up the unnecessary slack. My invention herewithin described renders this course unnecessary through the provision of the assembly about to be described which includes a number of shims, which are initially inserted between the ends of the circumscribing band or tire, these shims being capable of removal when the tire has become lengthened through usage.

Accordingly my invention consists of an assembly A which is located between the ends of the rim 1 of a wagon tire, from which it will be understood in the carrying out of my invention, I cut away a portion of the rim for this purpose. A recess 2 is chiselled out round the inner edge and the two side edges of the rim 1 at the opposing ends thereof, while a deeper recess 3, is chiselled out from the upper edge thereof. In this way a central projection 4 is provided and into the recesses thus formed I insert an end block 5, of the cross section clearly illustrated in Figure 2 of the drawing accompanying this specification, from which it will be seen that the same consists of a bearing plate 6 provided in the centre with a semi-circular recess 7 to receive one end of the right and left hand screw coupling 8 and a surrounding flange 9, the portion 10 of the flange being considerably deeper than that which extends around the remaining three sides to fit the recess 3. Thus, a recess is formed upon the rear side of the end blocks to receive the portion 4.

My tire 11 is secured at each end to a bearing block 12 by means of a pair of aligned rivets 13, each of the bearing blocks being provided with an internally threaded passageway 14 to receive my right and left hand screw coupling 8, the same consisting of a central, hexagonal wrench receiving portion 15 to facilitate turning and oppositely threaded rods 16 and 17.

From the section Figure 2 of the drawing accompanying this specification it will be seen that the upper portion 18 of each of my bearing blocks is rabbetted in the manner shown to receive a shim 19, the shims themselves each being of the configuration clearly illustrated, there being generally 3 shims inserted initially, although more or less may be used if desired, furthermore, the shims themselves may be of any desired width. In connection with my bearing blocks, I should mention that they may be made of any material, such as wood, composition or metal and in cases where this assembly is being used in the manufacture of new wagon wheels, they may, if desired, be welded to the two ends of the tire, one to each.

From the foregoing and from Figure 2 of the drawing accompanying this specification, it will be seen that the shims 19 interlock one with the other while the end shim locks between the upper portion 18 of the bearing block and the extreme end 20 of the tire. The shims are, however, prevented from buckling inwardly by virtue of the fact that one or other of the edges 15' at the junction of each of the surfaces forming the hexagonal wrench receiving portion 15 will bear against the lower surface of the shims along one of the edges thereof and it should be understood that the portion 15 will preferably always be rotated to the extent necessary to effect this bearing relationship.

From the foregoing description it will be readily perceived that when the tire 11 works loose, the procedure adopted will be to place a wrench around the portion 15 and the slack of the coupling. One of the shims will be then removed, after which the same will be rotated in the opposite direction, the two outer shims will then interlock and bring the ends of the tire close together, as the bearing blocks will move one towards the other and take the ends of the tire with them. When it is desired to remove a second or a third shim, the same procedure is adopted until the ends of the tire butt up against each other.

It will thus be seen that I have provided a simplified method of tightening loose wagon tires, which will eliminate the necessity of employing a wheelwright and which is practicable and of rugged construction.

What I claim as my invention is:

In a wagon wheel having a felly and a split tire encircling said felly, a tire tightening assembly located in a space provided in said felly, said space breaking the continuity of said felly, and comprising in combination, a right and left hand screw coupling, said coupling consisting of a wrench receiving portion and right and left hand screw-threaded rods upon either end of said portion, a pair of spaced bearing blocks having right and left-hand internally threaded apertures extending therethrough, each of said rods extending into one or other of said apertures, and each block being riveted to one end of said tire, one of said blocks being rabbeted and the other shouldered, a shim to fit between the surfaces of each of said blocks and the adjacent ends of said tire, the outer surface of said shim being flush with the outer surface of said tire, said shim being prevented from buckling inwardly by contact upon the inner surface thereof with one edge of the wrench receiving portion of said coupling, and a pair of end blocks, each of said blocks being secured upon one end of said felly and provided with a recess formed in the face thereof, one extremity of said coupling being receivable in each recess.

NICKOLAS OBRITSCHKEWITSCH.